United States Patent

[11] 3,569,609

[72] Inventors Timothy J. Fowler
 Webster Groves;
 Donald R. Frikken, Hazelwood, Mo.
[21] Appl. No. 841,631
[22] Filed July 14, 1969
[45] Patented Mar. 9, 1971
[73] Assignee Monsanto Company
 St. Louis, Mo.

[54] ELECTRODE JOINT
 1 Claim, 2 Drawing Figs.
[52] U.S. Cl. .................................................. 174/94,
 13/18, 287/127, 313/325, 313/355
[51] Int. Cl. .................................................... H02g 15/08
[50] Field of Search........................................ 174/94;
 313/354, 355, 325, 357; 287/127 (E); 13/18;
 314/60

[56] References Cited
UNITED STATES PATENTS
2,836,806 5/1958 Stroup......................... 174/84X
2,957,716 10/1960 Kaufman et al............. 287/127E Primary Examiner—Darrell L. Clay
Attorneys—Richard W. Sternberg, Roger R. Jones and Thomas N. Wallin ABSTRACT: Electrode joints comprising a resilient, conductive gasket, compressed between the apex of a tapered, threaded pin and the bottom of a tapered, threaded socket in an electrode member have improved electrical conductivity and greater freedom from thermally induced stresses.

PATENTED MAR 9 1971　　　　　　　　　　　3,569,609

INVENTORS
TIMOTHY J. FOWLER
DONALD R. FRIKKEN
BY
Thomas N. Wallin
ATTORNEY

ELECTRODE JOINT

BACKGROUND OF THE INVENTION

This invention relates to a novel electrode joint for connection of electrodes sections, particularly large electrode section of the type employed in various industrial electrical furnace operations.

It is well known to connect electrodes via threaded joint designs wherein the end of one electrode section is threaded to be screwed into a threaded socket of an adjacent section, or adjacent sections, each having threaded sockets, are connected via a nipple. Electrode joints of this type are disclosed, for example, in U.S. Pat. No. 3,101,385, and Canadian Pat. Nos. 600,211 and 597,984.

Such joints must be capable of withstanding lateral and vertical loads and stresses caused by differential thermal expansion. Differential thermal expansion stresses result from differences in expansion coefficients of joint members or temperature gradients in the joint under electrode operating conditions.

Hitherto, it has been considered an important requirement that the joint, in order to provide acceptable mechanical strength and electrical conductivity, be "closed" (i.e., that the faces of the joined electrodes be in intimate contact) under operating conditions. Unfortunately, designs capable of providing closed joints inherently cannot relieve stresses resulting from differential thermal expansion.

The relative merit of any electrode joint design is judged by the ability of the joint to resist physical failure and maintain adequate electrical conductivity over a wide range of temperatures.

SUMMARY OF THE INVENTION

It is an object of this invention to provide novel electrode joints having superior physical and electrical conductivity characteristics. This object is obtained by means of a joint comprising a threaded, tapered pin compressing a resilient gasket in a threaded tapered socket of an electrode section. The pin and socket are characterized by critical dimensional and thread design characteristics as hereinafter discussed.

The invention will be better understood from the drawings and the description of the preferred embodiments.

DESCRIPTION OF THE PREFERRED EMBODIMENTS

Figure 1:
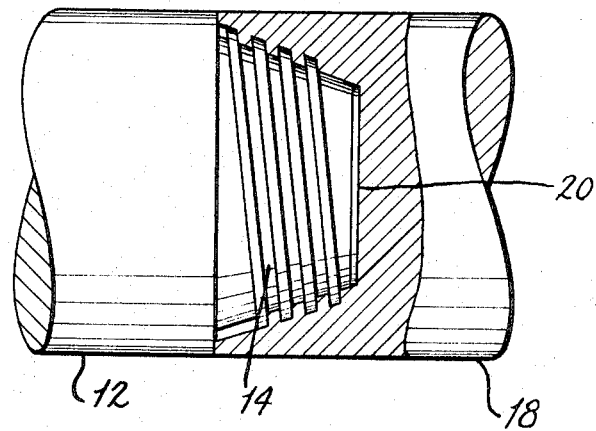
FIG. 1 is a sectional view of one embodiment of the joint of this invention.

The electrode joint of this invention is described by reference to FIGS. 1 and 2. As shown in FIG. 1, the joint comprises an electrode section 12, the end of which is fabricated into a tapered, threaded pin 14. This pin is screwed into a socket in a second electrode section 18 so as to compress a resilient, electrically conductive gasket 20 in the bottom of the socket.

Figure 2:
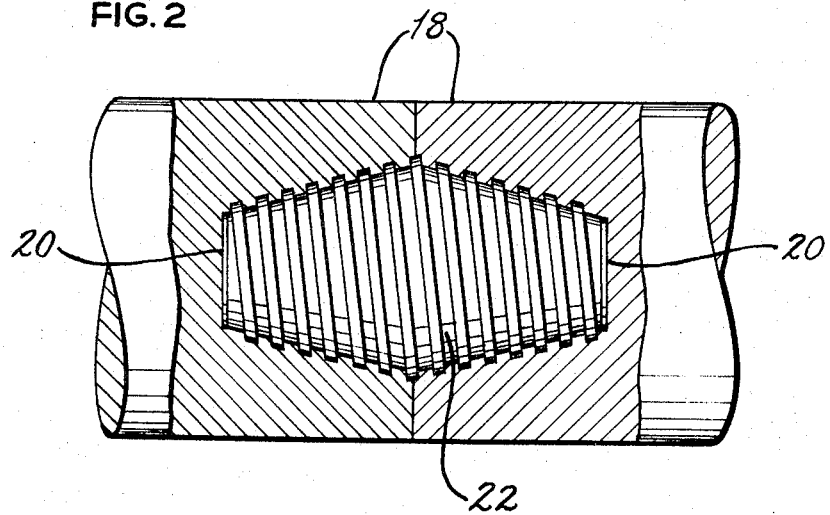
FIG. 2 is a sectional view of another embodiment of the joint of this invention.

In the joint shown in FIG. 2, two electrode sections 18 each having tapered, threaded sockets are connected by a pin 22, each end of which is tapered and threaded, compressing resilient gaskets 20 in the bottom of each socket.

Preferably, the electrodes and pin are fabricated of carbon or graphite, but, if desired, other conventional electrode materials can be utilized.

In order to provide the advantages of this invention, it is essential that critical limitations be maintained with regard to:

a. the diameter of the base of the pin and the opening of the socket relative to the diameter of the electrode;

b. the length of the pin and depth of the socket relative to the electrode diameter;

c. the diameter of the apex of the pin and bottom of the socket;

d. the pitch threads of pin and socket;

e. the depth of the threads of pin and socket;

f. the thread thickness of pin and socket;

g. the thread angle of pin and socket;

h. the clearance between the crests of the pin and socket threads and the roots of socket and pin threads; and i. the gasket characteristics.

The limitations with respect to each of the foregoing variables must be simultaneously observed since the proper functioning of the joint of this invention required cooperative interaction of the design elements thereof.

The specific requirements of each element are discussed individually below. It will be recognized by those skilled in the art that these requirements are, in many instances, not only distinct from, but are contrary to the requirements of conventional joint design. That is, the use of individual design factors specified below in conjunction with conventional joints would, in many instances, result in joint failure.

PIN AND SOCKET DIAMETERS

The diameter of the base of the pin and the opening of the socket is defined as the diameters of these members at the interface of the electrode sections being joined.

This diameter must be from 0.6 to 0.95 times the diameter of the electrode. Such pin and socket diameters will be recognized by those skilled in the art as appearing abnormally large. Previously, it was considered that such dimensions would result in a socket wall too thin to resist rupture when subjected to loads and stresses. In the electrode joint of this invention, however, the specified dimensions are essential to prevent mechanical failure under external load. Failure resulting from other stresses is prevented by other design elements hereinafter discussed.

PIN LENGTH AND SOCKET DEPTH

The range of acceptable pin length (and corresponding socket depths) is from 10 to 40 percent of the electrode diameter, a length equal to about 20 percent of the electrode diameter being preferred. It will be seen by those skilled in the art that this length is unusually small and would not be expected to provide sufficient thread area to withstand longitudinal stresses in a conventional closed joint.

PIN APEX AND SOCKET BOTTOM DIAMETERS

The maximum permissible diameter of the pin apex or socket bottom is $0.816 D_E$ or $D-L/10$, whichever is smaller.

The minimum diameter is $D-2L$ or $L/10$ whichever is larger.

In the foregoing expressions;

$D$ = pin and socket diameters at interface $D_E$ = diameter of the electrode $L$ = length of the pin If the diameter exceeds the maximum, the socket becomes too weak to withstand external loads. If the diameter is less than the minimum, the taper angle becomes too steep to practically accommodate threads and insufficient area is available to properly compress the gasket.

PITCH

The pitch of the pin and socket threads can be uniform or variable, but the variable pitch is an expensive machine operation and there is no advantage to a variable pitch in this joint design. As shown above, the pitch is interrelated with other variables (pin and socket dimensions) other thread dimensions, and the pin, socket, and gasket material properties). The pitch should be as small as practicable so as to obtain a uniform stress distribution around the socket. The minimum pitch is governed by machining considerations. For example, when considering a 40- to 60-inch diameter electrode fabricated from graphite particle filled amorphous carbon, the suggested range of the pitch is from 1.0 to 4.0 inch. For graphites and find grained carbons, the minimum pitch can be as small as one-eighth inch. The unique and critical feature regarding the pitch of the threads used in the joint of this invention is that at ambient conditions, the pitch of the socket threads must be greater than the pitch of the pin threads by a factor of from .025 to 1.9 percent. Such a mismatch of pitch results in increased electrical conductivity as the pin undergoes differential thermal expansion during operation of the electrode. In the joint design of this invention, the mismatched pitch does not induce undue stresses as contrasted to conventional joint design wherein pitch of pin and socket are closely matched to minimize stress.

THE DEPTH OF THREAD (SOCKET & PIN)

The depth of the thread is dependent on other variables, but in general should be equal to about half the pitch. The range is from $0.25P$ to $1.0P$ ($P$=pitch), the choice being dependent on the strength of the material, the conductivity of the material, the thread thickness and the diametral clearance.

THE THREAD THICKNESS (SOCKET & PIN)

The thread thickness at pitch diameter is from 0.25 to 0.75 times the pitch, a thickness of about half the pitch being preferred.

THE THREAD ANGLE (SOCKET & PIN)

The thread angle (the angle between thread faces) must not exceed 30°, a maximum of 5° or less being preferred. Although larger angles are employed in conventional joints to facilitate joint assembly and to provide proper stress characteristics, the angles specified are required in the joint of this invention to prevent undue stress and maintenance of adequate electrical contact.

CLEARANCES

The diametral clearance between the pin and the socket must allow for differential radial expansions of the pin and socket so that the pin will not "push" the socket out. The clearance at ambient temperature must be at least the maximum value given by the following formula over the entire operating temperature range at any point on the pin:

$$\text{Clearance} = \frac{(a_p T_p - a_s T_s)}{1 + a_s T_s}$$

Where $d_p$ = ambient temperature diameter of the pin
$\alpha_p$ = overall coefficient of thermal expansion of the pin material from ambient temperature as a function of temperature
$\alpha_s$ = overall coefficient of thermal expansion of the socket material from ambient temperature as a function of temperature
$T_p$ = temperature of the pin
$T_s$ = temperature of the socket

GASKET CHARACTERISTICS

The gasket is comprised of a compressible material which is sufficiently resilient to maintain contact between thread faces via elastic fence. In addition, the gasket, when under 10 pounds per square inch (gauge) compressive form, must exhibit electrical resistance of less than .05 ohms/square inch. Suitable gasket materials can be fabricated from a combination of skeletal and natural graphite as described, for example, in Canadian Pat. No. 579,984 (Jul. 21, 1959).

The design of the joint is such that only the thread at the apex of the pin and the bottom of the socket are in contact when the joint is cool. As current is passed through the electrode, preferentially through the pin, the pin will expand at a greater rate than the socket and additional threads will come into contact. This effects improved conductivity and reduced heating of the joint until an equilibrium is established. Further, the large diameter of the pin facilitates current transfer.

It is seen that the joint of this invention, at least under normal operating conditions, will be open. That is, the faces of adjacent electrode sections will not be in intimate contact. It is found that the large diameter of the pin and socket opening are acceptable under these conditions since the pin is sufficiently strong to withstand lateral loads and the open joint design dissipates thermal expansion stresses which might otherwise rupture the thin socket wall.

We claim:

1. An electrode joint comprising, in combination:
  a. a threaded, tapered pin;
  b. an electrode member having a threaded, tapered socket with said pin received therein; and
  c. a resilient, electrically conductive gasket compressed between the apex of said pin and the bottom of said socket, the diameters of the base of said pin and the opening of said socket being from 0.6 to 0.95 times the diameter of the electrode; the length of said pin and the depth of said socket being from 0.10 to 0.40 times the electrode diameter; the diameter of the apex of said pin and the bottom of said socket being from the larger of the values given by the expressions $D-2L$ and $L/10$ to the smaller of the values given by the expressions $0.816 D_E$ and $D-L/10$ wherein $D$ is diameter of the base of the pin, $D_E$ is the diameter of the electrode, and $L$ is the length of the pin; the pitch of the socket threads is from .025 to 1.9 percent greater than the pitch of the pin threads; the depth of the pin and socket threads is from 0.25 to 1.0 times their pitch; the thickness of the pin and socket threads at pitch diameter is from 0.25 to 0.75 times their pitch; the angle of the threads of pin and socket is from 0—30°; the ambient temperature diameter clearance between pin and socket being at least the maximum value of the formula $d_p (\alpha_p T - \alpha_s T_s)/(1+\alpha_s T)$ over the operating temperature range of the electrode where $d_p$ is the diameter of the pin at ambient temperature, $\alpha_p$ and $\alpha_s$ are the overall coefficients of thermal expansion of pin and socket, respectively, from ambient temperature as a function of temperature and $T_p$ and $T_s$ are, respectively, the temperatures of the pin and socket.

UNITED STATES PATENT OFFICE
CERTIFICATE OF CORRECTION

Patent No. 3,569,609    Dated March 9, 1971

Inventor(s) T J. FOWLER and D.R. KRIKKEN

It is certified that error appears in the above-identified patent and that said Letters Patent are hereby corrected as shown below:

Column 4, line 53, the formula reading "$(\alpha_p T - \alpha_s T_s)/(1+\alpha_s T)$" should read -- $(\alpha_p T_p - \alpha_s T_s)/(1+\alpha_s T_s)$ --.

Signed and sealed this 26th day of December 1972.

(SEAL)
Attest:

EDWARD M. FLETCHER, JR.
Attesting Officer

ROBERT GOTTSCHALK
Commissioner of Pa